US012761369B2

(12) United States Patent
Weger

(10) Patent No.: US 12,761,369 B2
(45) Date of Patent: Oct. 13, 2026

(54) SYNCHRONIZATION OF DIGITAL ANTENNA CONTROLLER DATA FOR APPLICATIONS USING ASYNCHRONOUS INTERFACES

(71) Applicant: BAE SYSTEMS Information and Electronic Systems Integration Inc., Nashua, NH (US)

(72) Inventor: John Jay Weger, Ely, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 686 days.

(21) Appl. No.: 18/308,095

(22) Filed: Apr. 27, 2023

(65) Prior Publication Data

US 2024/0361466 A1 Oct. 31, 2024

(51) Int. Cl.
*H04L 1/00* (2006.01)
*G01S 19/07* (2010.01)
*G01S 19/13* (2010.01)

(52) U.S. Cl.
CPC .............. *G01S 19/13* (2013.01); *G01S 19/07* (2013.01)

(58) Field of Classification Search
CPC ........ G01S 19/13; G01S 19/07; G01S 19/235; G01S 19/30; G01S 19/35; G01S 19/37; G01S 19/21; G01S 19/36
USPC ...................................................... 455/456.1
See application file for complete search history.

(56) References Cited

U.S. PATENT DOCUMENTS

| | | | | |
|---|---|---|---|---|
| 7,764,224 | B1 | 7/2010 | Anderson | |
| 8,725,400 | B1 | 5/2014 | Anderson | |
| 11,337,034 | B1 | 5/2022 | Doty et al. | |
| 2003/0207681 | A1* | 11/2003 | Rowitch | G01S 19/07 370/335 |
| 2014/0302872 | A1 | 10/2014 | Lane et al. | |
| 2018/0034617 | A1* | 2/2018 | Zavadsky | H04L 5/14 |
| 2018/0196142 | A1 | 7/2018 | Levy et al. | |
| 2019/0324154 | A1* | 10/2019 | Freestone | G01S 19/21 |
| 2021/0364649 | A1 | 11/2021 | Phan et al. | |
| 2022/0003879 | A1 | 1/2022 | Zeitzew et al. | |
| 2022/0322259 | A1* | 10/2022 | Zhuge | H04W 56/002 |

OTHER PUBLICATIONS

International Search Report, PCT/US24/24574, mailed Oct. 1, 2024, 13 pages.

* cited by examiner

*Primary Examiner* — Tanmay K Shah
(74) *Attorney, Agent, or Firm* — Scott J. Asmus; Gary McFaline

(57) ABSTRACT

A Global Positioning System (GPS) digital antenna controller is provided, comprising antenna electronics, a code generator, and an interface. The antenna electronics can be configured to receive a GPS signal. The code generator can be configured to generate a pilot code signal that is synchronized to the DAE local clock reference. The interface can be configured to send the GPS signal and the code signal to a GPS receiver. A system may comprise the GPS digital antenna controller and GPS receiver. The GPS receiver can comprise a second code generator and a processor configured to resolve a timing difference based on the pilot code signal and a second code signal of the second code generator. The controller may be remote from the receiver. The interface may comprise an asynchronous data interface (e.g., Ethernet, USB, Infiniband, or Firewire). To resolve the timing difference may involve GPS code and carrier tracking.

10 Claims, 6 Drawing Sheets

SYNCHRONIZATION OF DIGITAL ANTENNA CONTROLLER DATA FOR APPLICATIONS USING ASYNCHRONOUS INTERFACES

BACKGROUND

The advent of digital Global Positioning System (GPS) antenna controllers allows for array steering to create individual beams directing gain at satellites as well as excision of interference signals, improving receiver immunity from noise. Each GPS satellite signal is provided to the baseband digital GPS receiver on a separate beam, that is, on a separate stream of digital data. For example, for each satellite being steered by the array, there is a unique bit-stream that is independent from all others. Multiple streams are transmitted to the GPS baseband processor to provide simultaneous coverage of the satellites and frequencies. These individual digital beams may be fed as baseband digital in-phase and quadrature components (I/Q) of data to an integrated GPS processor on board for integrated solutions where the GPS digital baseband processor is housed inside the unit with the antenna electronics. For applications such as aircraft embedded GPS inertial navigators where the GPS may be remote from the antenna electronics, the data is transmitted from the antenna electronics to the GPS digital processor via a high-speed digital coaxial cable using digital transmission. One aspect of this digital beam interface is synchronization of the clocks between the antenna electronics and baseband GPS digital processor. With on-board GPS processors, synchronization is relatively straightforward, as the frequency standard is housed inside the same unit and provided to both the antenna controller and GPS signal processor. However, for remote digital GPS receivers, the digital coaxial beam interface must also carry the frequency standard, which is reproduced at the baseband GPS digital processor by the receiving circuit.

SUMMARY

In an example, a Global Positioning System (GPS) digital antenna controller is provided. The GPS digital antenna controller can include antenna electronics, a digital antenna controller clock, a code generator, and an interface. The antenna electronics can be configured to receive a GPS signal. The digital antenna controller clock configured to regulate antenna sampling of the antenna electronics or to provide a reference for downconversion. The code generator can be configured to generate a code signal synchronized with the digital antenna controller clock. The interface can be configured to send the GPS signal and the code signal to a GPS receiver.

In another example, a Global Positioning System (GPS) receiver is provided. The GPS receiver can comprise an interface, a code generator, and a processor. The interface can be configured to receive a GPS signal and a pilot code signal from a GPS digital antenna controller. The code generator can be configured to generate a second code signal. The processor can be configured to resolve a timing difference based on the pilot code signal and the second code signal of the second code generator.

In another example, a system is provided. The system can include the GPS receiver and the GPS digital antenna controller of the previous example. The code generator can be a second code generator, and the interface can be a second interface. The GPS digital antenna controller can be remote from the GPS receiver. The GPS digital antenna controller can include a first code generator and a first interface. The first code generator can be configured to generate the pilot code signal synchronized with an antenna sampling clock or downconversion reference clock. The first interface can be configured to send the pilot code signal from the GPS digital antenna controller.

In another example, a Global Positioning System (GPS) method is provided. The method can comprise receiving, by a GPS digital antenna controller, a GPS signal. The method can further comprise generating, by a first code generator of the GPS digital antenna controller, a pilot code signal synchronized with an antenna sampling clock or downconversion reference clock. The method can further comprise sending, by the GPS digital antenna controller and via a asynchronous data interface, the GPS signal and the pilot code signal to a GPS receiver comprising a second code generator. The method can further comprise resolving, by a processor of the GPS receiver, a timing difference based on the pilot code signal and a second code signal of the second code generator.

DETAILED DESCRIPTION

Techniques are disclosed to provide synchronization of digital antenna controller data for Global Positioning System (GPS) applications. In an example, the techniques can be implemented using asynchronous interfaces. The techniques are particularly useful for systems having a GPS receiver that is remote from the antenna electronics. An example method includes generating, by a first code generator of a GPS digital antenna controller, a pilot code signal. The method further includes sending, by the GPS digital antenna controller, the pilot code signal to a GPS receiver comprising a second code generator. The method continues with resolving, by the GPS receiver, a timing difference based on the pilot code signal and a second code signal of the second code generator. A number of variations and systems will be appreciated in light of this disclosure.

General Overview

As described above, one aspect of a current generation digital beam interface (e.g., a high-speed digital coaxial cable using a Serializer/Deserializer (SERDES) protocol) used to connect antenna electronics to a GPS digital processor is synchronization of the clocks between the antenna controller's downconverter (e.g., heterodyne) and the GPS receiver's baseband GPS digital processor. Synchronization of these clocks can be critical, given that GPS processing uses both phase and frequency to determine precise location, and requires the clock used in the real-time correlation process to be synchronized with the radio frequency (RF) downconverter reference clock.

The need for clock synchronization between digital antenna electronics (DAE) and the GPS receiver can be a limitation in some GPS applications, as it disallows use of industry standard high-speed data interfaces that operate using asynchronous transmit/receive protocols. Examples of such interfaces include Ethernet, USB, Infiniband, and Firewire (e.g., IEEE1394). In particular, these standard interfaces are high-speed and capable of carrying far more data than a digital coaxial cable implementation, thus allowing for expansion of the number of beams (unique antenna solutions) and transport of additional information related to the beam data (such as distortion and presence of detected interference). However, these standards are also nominally asynchronous and thus incapable of preserving the clock recovery function available in the SERDES protocol. Accordingly, clock synchronization techniques are needed.

Thus, techniques are provided herein that can perform precise synchronization of the disparate clocks associated with the DAE and receiver of a given GPS application. The disclosed techniques are independent of the physical transport layer, and do not require unique hardware for clock synchronization between DAE and GPS receiver.

Figure 1:
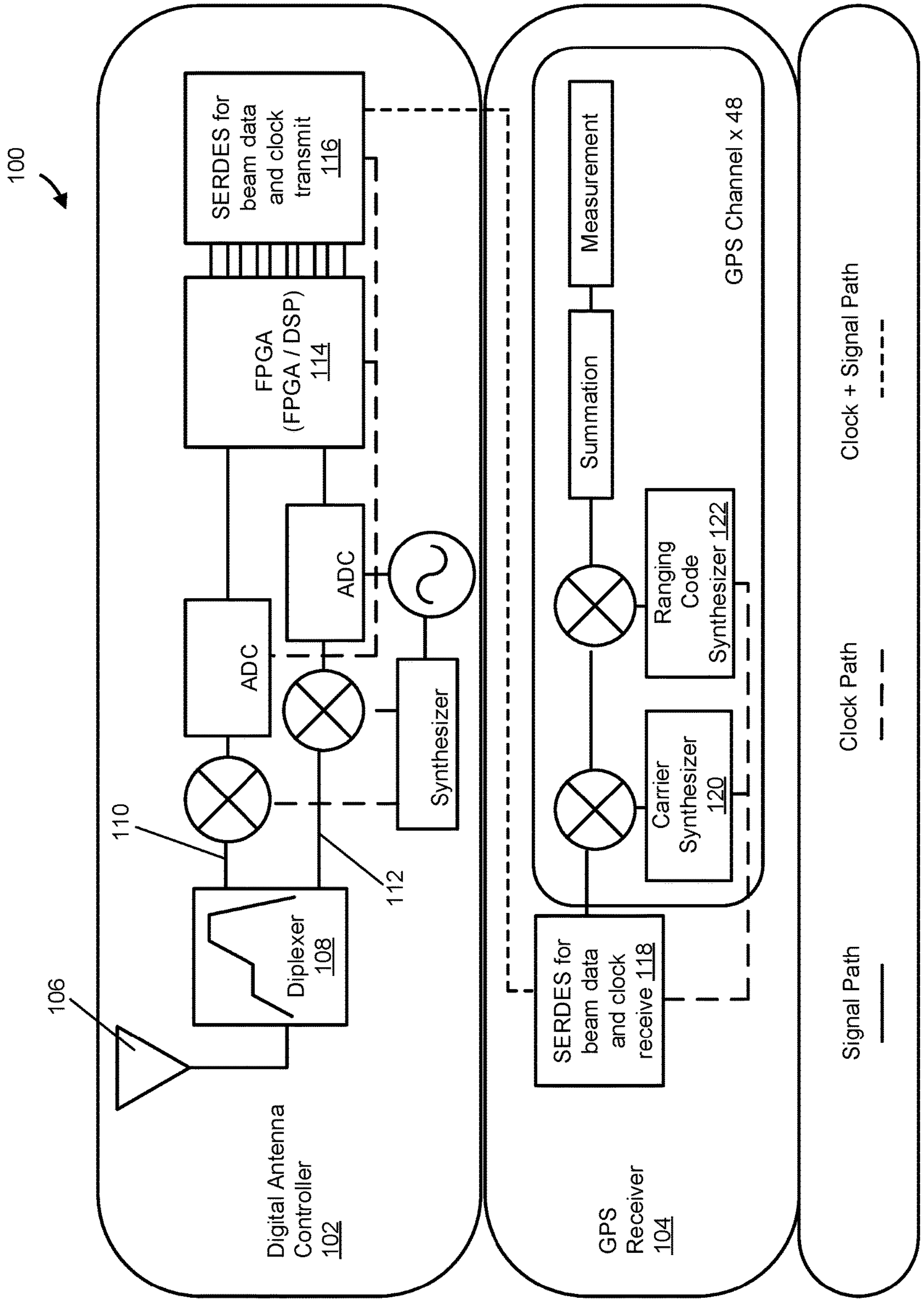
FIG. 1 is a block diagram illustrating a Global Positioning System (GPS) system having a GPS receiver that is remote from the antenna electronics, and susceptible to noncoherency.

FIG. 1 is a block diagram illustrating a system 100 having a Global Positioning System (GPS) receiver 104 that is remote from digital antenna electronics (DAE) of a GPS digital antenna controller 102 (also referred to as a beamformer). As further explained below, the system is susceptible to noncoherency between the chipping code and the carrier wave, due to a loss or otherwise lack of synchronization. In this example, the digital antenna controller 102 can include an antenna or antenna array 106 that receives a directional GPS signal, for example from a respective GPS constellation satellite along a particular line of sight.

In an example, the received GPS signal can include a chipping code embedded in a carrier wave. The carrier wave may be transmitted by a respective GPS constellation satellite at a carrier frequency, for example an L1 carrier frequency (e.g., 1.57542 GHz), an L2 carrier frequency (e.g., 1.2276 GHz), an L5 carrier frequency, an E5 carrier frequency, an E6 carrier frequency, or another carrier frequency. In an example, the chipping code may include a DSSS code, such as a pseudo-random noise (also referred to as PN or PRN) code sequence, of which the receiver may possess a copy. For example, a binary PN code may have a length of 1,023 bits, or some other number of bits. The received GPS signal may also include other information. For example, the received GPS signal may include a time of transmission (TOT), according to the respective GPS constellation satellite's clock, of a portion, such as an epoch, of the PN code. The received GPS signal may include the respective GPS satellite's location in space (e.g., within the satellite's orbit) at the time of broadcast.

The digital antenna controller 102 can additionally include electronics to perform beamforming functions such as diplexing, demodulation, and the like, so as to obtain respective beams directing gain at respective satellites of the GPS constellation. For example, the antenna controller 102 can include a diplexer 108 that feeds two circuit branches 110 and 112. Each of branches 110 and 112 can be passed through a respective analog-to-digital converter (ADC), resulting in two digital data streams that may be combined via the field-programmable gate array (FPGA) 114. In some examples, beamforming may be performed in the FPGA 114.

The GPS receiver 104 can be remote from digital antenna controller 102, for example in an aircraft embedded GPS inertial navigator. In order to maintain clock synchronization between DAE 102 and GPS receiver 104, the output signal from FPGA 114 may be transmitted via a high-speed digital coaxial cable using a Serializer/Deserializer (SERDES) protocol between SERDES interface 116 of digital antenna controller 102 and SERDES interface 118 of GPS receiver 104. In an example, the data may be serialized by SERDES interface 116 and transmitted serially via the high-speed digital coaxial cable at a rate of 2 GHz. After being received and deserialized at SERDES interface 118, the signal may be transmitted into the receiver at the antenna's sampling rate, which may be the rate at which the DAE digitally samples live-sky data, such as 22 MHz, or 44 MHz per channel. The signal can transmit through carrier synthesizer 120 and ranging code synthesizer 122, which can locally generate a carrier and code, respectively. The carrier synthesizer 120, ranging code synthesizer 122, and/or other electronics of receiver 102 (e.g., an FPGA, ASIC, or the like) can compare the locally-generated carrier and code against the signal received via SERDES interface 118, so as to determine a Doppler shift and precise time of transmission associated with the respective GPS satellite, and thereby determine a location.

In particular, the received GPS signal includes an embedded carrier frequency and a chipping code. The initial downconverter (e.g., heterodyne) may affect the carrier of the GPS but not the code. In particular, the chipping code may remain unaffected when the GPS downconverts the carrier frequency from L band, at which the signal is received, to a baseband frequency, at which the signal is processed. Because the carrier is affected by the bias of the local clock, when the carrier is mixed down using one clock in DAE 102 and tracked using another clock in receiver 104, the carrier and the code could become noncoherent. Accordingly, in order to maintain the synchronization of the carrier and code, the signal may be transmitted via a high-speed digital coaxial cable using SERDES interface 116 and SERDES interface 118.

The need for precise clock synchronization between DAE 102 and GPS receiver 104 can be a severe limitation of some systems, as it disallows use of industry standard high-speed data interfaces that operate using asynchronous transmit/receive protocols. Examples of such asynchronous interfaces include Ethernet, USB, Infiniband, and Firewire (e.g., IEEE1394). These interfaces are capable of carrying far more data than a digital coaxial cable implementation, allowing for expansion of the number of beams (unique antenna solutions) and transport of additional information related to the beam data such as distortion, presence of detected interference, etc. The disclosed system and methods can address these challenges, as described herein.

Figure 2:
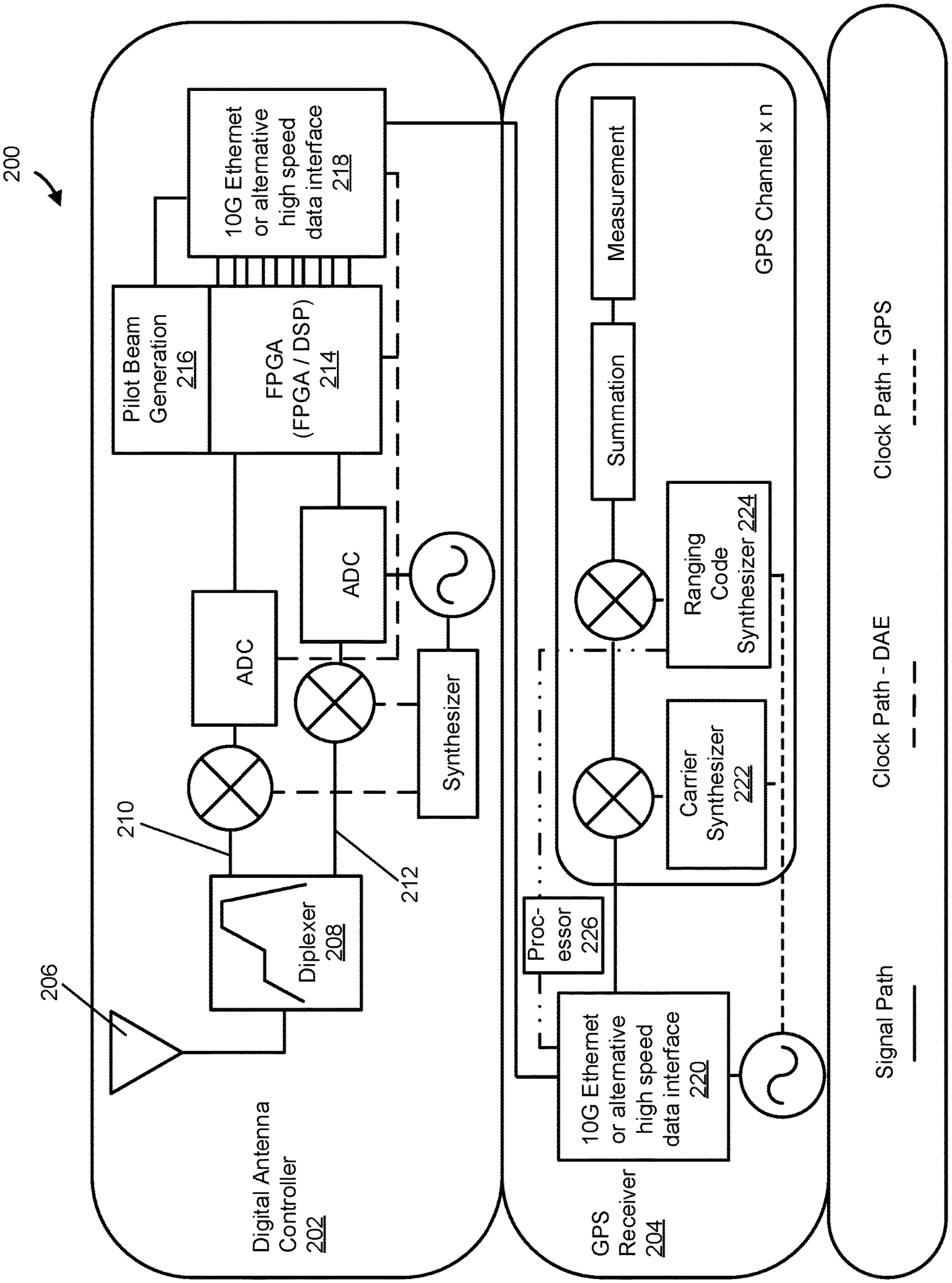
FIG. 2 is a block diagram illustrating a GPS with a digital antenna controller configured to generate and send a code signal to a GPS receiver, in accordance with an example of the present disclosure.

FIG. 2 is a block diagram illustrating a system 200 with a GPS digital antenna controller 202 configured to generate and send a code signal to a GPS receiver 204, in accordance with an example of the present disclosure. In this example, as in FIG. 1, the digital antenna controller 202 (also referred to as a beamformer) can include antenna or antenna array 206 as well as beamforming electronics such as a diplexer

208. Diplexer 208 can feed circuit branches 210 and 212, which can be passed through ADCs, and be combined via FPGA 214.

However, in this example, the digital antenna controller 202 can include a code generator 216, which can generate a pilot or heartbeat signal locally. This locally-generated pilot signal may be identical to the signal generated by a GPS satellite, but without a Doppler shift, and with a frequency and phase set by the local oscillator clock of the digital antenna controller 202. For example, the pilot code signal can include a direct sequence spread spectrum (DSSS) waveform and the first code generator can include a pseudo-random noise (also referred to as PN or PRN) code generator. In some examples, the code generator 216 can be configured to generate the pilot code signal as a continuous GPS pseudo-random code and carrier signal using DSSS encoding. The system can use the locally-generated pilot signal to synchronize the local clocks of digital antenna controller 202 and receiver 204, as disclosed herein below. In some examples, the locally-generated pilot signal may be synchronized with the DAE's digital antenna sampling of the live-sky data (e.g., at the antenna sampling rate, such as 22 MHz, or 44 MHz per channel) and with the antenna controller's downconversion clock or frequency reference.

The system 200 further differs from system 100 of FIG. 1 in that it also includes a high-speed data interface 218 for digital antenna controller 202, and a second high-speed data interface 220 for receiver 204. For example, the high-speed data interfaces 218 and 220 may include asynchronous interfaces for Ethernet, USB, Infiniband, Firewire (e.g., IEEE1394), or the like. The high-speed data interface 218 can send the GPS signal received via antenna or antenna array 206, after being beamformed (e.g., diplexed and recombined), as described above. The high-speed data interface 220 can receive the signal output from FPGA 214 for processing by the receiver 204. In particular, the receiver 204 can include carrier synthesizer 222 and ranging code synthesizer 224, which can locally generate a carrier and code to compare to the received signal, in order to determine Doppler shifts, a precise time of transmission, and a GPS location, as in the example of FIG. 1 above.

In addition, the signal transmitted between high-speed data interfaces 218 and 220 may also include the pilot signal generated by code generator 216. For example, the digital antenna controller may simultaneously send the GPS signals and the synthesized pilot code/carrier signal between the high-speed data interfaces 218 and 220 by way of dedicated beams. As described below in the examples of FIGS. 4 and 5A-5B, the GPS receiver 204 and/or one or more processors 226 can synchronize the pilot signal with the received beamformed GPS signal, so that a level of certainty can be achieved between the local clock oscillators of DAE 202 and GPS receiver 204. For example, the dedicated beam for the synthesized pilot code/carrier signal may be used by the digital GPS baseband processor as a pilot signal to correlate with the channel beam data and to determine the exact offset of the GPS receiver clock relative to the antenna controller's downconversion clock.

Accordingly, it is possible for the GPS receiver 204 to process the GPS signal accurately without having to be serialized/deserialized or transmitted via coaxial cable. For example, the GPS receiver 204 may apply a so-called paper clock method, that is, GPS receiver 204 may use information about the discrepancy or offset between clocks to track and/or correct the offset between the two clock domains via software. In this example, the GPS receiver 204 can include one or more processors 226 that can execute the disclosed methods, for example via software. As illustrated, processors 226 can receive the pilot signal from the high-speed data interface 220, and can compare this to the locally-generated carrier and code received from ranging code synthesizer 224. Alternatively or additionally, the GPS receiver 204 may correct the clock offset via hardware or may apply another method to correct the offset. In this example, the one or more processors 226 are shown internal to GPS receiver 204, but may be external in some examples.

By virtue of applying tracking and information to correct the discrepancy or offset between clocks, the disclosed system 200 can improve over some GPS systems by utilizing industry standard high-speed data interfaces that implement asynchronous transmit/receive protocols. In particular, high-speed data interfaces 218 and 220 may be capable of carrying more data than the digital coaxial cable implementation of FIG. 1. Accordingly, compared with the system 100 of FIG. 1, the high-speed data interfaces 218 and 220 used in system 200 may enable an expanded number of beams (i.e., more unique antenna data streams) and the transmission of additional information regarding the beam data, such as distortion, detected interference, etc.

Methodology

Figure 3:
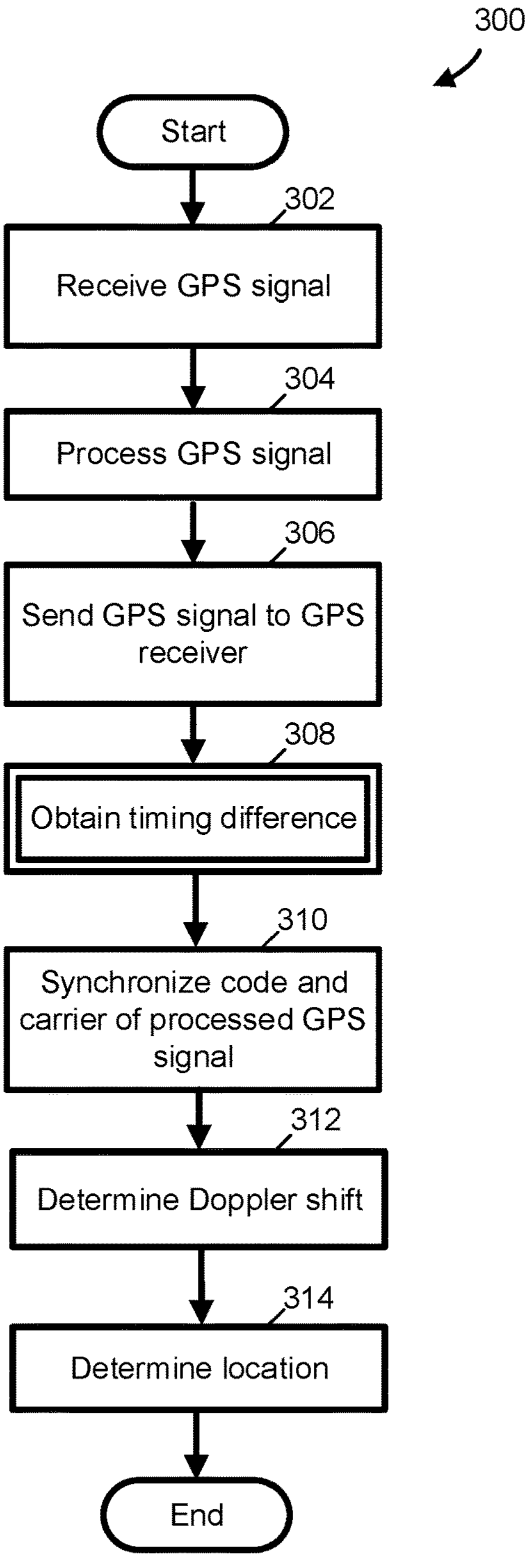
FIG. 3 is a flow diagram illustrating a GPS geolocation method, in accordance with an example of the present disclosure.

FIG. 3 is a flow diagram illustrating a GPS geolocation method, in accordance with an example of the present disclosure. In various examples, method 300 may be performed by a digital antenna controller and a receiver. For example, the digital antenna controller and receiver can belong to a system, such as the digital antenna controller 202, the GPS receiver 204, and/or the processor 226 of the system 200 in FIG. 2. In some examples, the receiver may be remote from the digital antenna controller, for example in an aircraft embedded GPS inertial navigator.

As shown in FIG. 3, the GPS geolocation method can start with a digital antenna controller receiving 302 a GPS signal. For example, the GPS's antenna or antenna array and/or the digital antenna controller can receive 302 a directional GPS signal, for example from a respective GPS constellation satellite along a particular line of sight.

In an example, the received 302 GPS signal can include an embedded carrier frequency and a chipping code. For example, the chipping code may include a DSSS code, such as a binary PN code sequence, of which the receiver may possess a copy. For example, a binary PN code may have a length of 1,023 bits, or some other number of bits. The received 302 GPS signal may also include other information. For example, the received 302 GPS signal may include a time of transmission (TOT), according to the respective GPS constellation satellite's clock, of a portion, such as an epoch, of the PN code. The received 302 GPS signal may include the respective GPS satellite's location in space (e.g., within the satellite's orbit) at the time of broadcast.

The initial downconverter may affect the carrier of the GPS but not the chipping code. In particular, the chipping code may remain unaffected when the GPS downconverts the carrier frequency from L band, at which the signal is received, to the baseband frequency at which the signal is processed.

Next, the GPS geolocation method can continue with the digital antenna controller processing 304 the GPS signal. For example, the digital antenna controller can perform beamforming functions such as diplexing, demodulation, and the like, so as to obtain respective beams directing gain at respective satellites. In some examples, the digital antenna controller can also pass the resulting signals through ADCs, and recombine the signals via an FPGA. In some examples, beamforming may be performed in the FPGA.

Next, the GPS geolocation method can continue with the digital antenna controller sending 306 the processed GPS signal to the GPS receiver. In some embodiments, sending 306 the processed GPS signal also includes sending a locally-generated pilot or heartbeat signal to the GPS receiver, as described in the examples of FIGS. 2 and 4.

In some examples, the digital antenna controller sends 306 the processed GPS signal and/or the pilot signal via a high-speed data interface of the digital antenna controller, and the receiver receives the processed GPS signal and/or the pilot signal via a high-speed data interface of the receiver, as in the example of FIG. 2. For example, the high-speed data interfaces may include standard interfaces, such as for Ethernet, USB, Infiniband, Firewire (e.g., IEEE1394), or the like. Alternatively or additionally, the digital antenna controller can send 306 the processed GPS signal via any other method, such as a SERDES protocol and/or a coaxial cable.

Next, the GPS geolocation method can continue with the receiver receiving the GPS signal from the digital antenna controller and obtaining 308 a timing difference. For example, the timing difference may be a timing difference between the GPS digital antenna controller's clock and the receiver's local clock. In an example, obtaining 308 the timing difference can involve computing the timing difference based on a pilot signal generated by the digital antenna controller and driven by the digital antenna controller's clock. Obtaining 308 the timing difference will be described in greater detail below in the examples of FIGS. 4 and 5A-5B.

Next, the GPS geolocation method can continue with the receiver synchronizing 310 a code and carrier of the processed GPS signal received from the digital antenna controller. In some examples, synchronizing 310 the code and carrier may be based on a code signal generated locally by the receiver, for example, by carrier synthesizer 222 and/or ranging code synthesizer 224 of the example of FIG. 2. For example, the code signal generated locally by the receiver may be identical to the synthesized pilot code signal from the GPS digital antenna controller, except the locally-generated code signal may be generated based on the GPS receiver's local clock. In some examples, the GPS receiver can perform time and/or frequency synchronization of the pilot code signal and second code signal.

The receiver can synchronize 310 the code signal generated locally by the receiver and the processed GPS signal received from the digital antenna controller by searching through code phase space in order to determine a time of arrival (TOA) of a given point in the chipping code. The receiver may use carrier frequency tracking and PN code tracking to determine a phase shift corresponding to the beginning of the respective GPS satellite's PN code. For example, the receiver can determine a TOA according to the receiver's local clock of a portion, such as an epoch, of the PN code that agrees between the locally generated code signal and the received GPS signal. This search through code phase space can involve a GPS code and carrier tracking procedure, which may be similar to the process described below in FIG. 5B, but may be applied to the received GPS signal for the purpose of geolocation. In some examples, the receiver may periodically and/or continuously implement such a tracking procedure for each GPS satellite from which it receives a signal.

In some examples, synchronizing 310 the code and carrier may be based on the timing difference obtained in operation 308.

Next, the GPS geolocation method can continue with the receiver determining 312 a Doppler shift based on the synchronized code and carrier. In some cases, determining 312 the Doppler shift can include determining a precise time of transmission.

In some examples, the system may determine 312 a Doppler shift of the received carrier frequency, based on a GPS carrier frequency tracking procedure. For example, the system may determine 312 the Doppler shift as a frequency offset from the carrier frequency by determining a frequency and/or phase shift corresponding to a maximum correlation between the received and locally-generated signals. The system may then compute a relative velocity of the respective satellite based on the frequency offset. In some examples, such a GPS carrier frequency tracking procedure can be similar to the processes described below in FIGS. 5A-5B, but may be applied to the received GPS signal for the purpose of geolocation.

In some examples, if the code and carrier are synchronized in operation 310 based on the timing difference obtained in operation 308, the determined 312 Doppler shift can also depend on the obtained timing difference. Accordingly, the disclosed system's ability to determine 312 the Doppler shift may depend on accurately resolving the timing difference between the clocks via the methods disclosed herein.

In some examples, the system may also properly scale tracking of the live-sky GPS signals, e.g. from the digital live-sky beams, based on the determined 312 Doppler shift.

Next, the GPS geolocation method can continue with the receiver determining 314 a location based on the determined Doppler shift. For example, the receiver can use information from the received GPS signal, such as the TOT and/or the sending GPS satellite's location, together with the determined TOA and Doppler shift, to determine 314 a location of the digital antenna controller's antenna at the TOA.

In some examples, the receiver can determine the TOAs and times of flight (TOFs) of four GPS signals, for example from four respective GPS satellites. In some examples, the receiver can further compute pseudo-ranges, for example based on the TOFs divided by the speed of light. The receiver can then determine 314 the Doppler shift and the location, for example based on the TOFs and/or pseudo-ranges.

In some examples, if the code and carrier are synchronized in operation 310 based on the timing difference obtained in operation 308, the determined 314 location can also depend on the obtained timing difference. Accordingly, the disclosed system and methods can improve over other GPS systems by resolving the timing difference and determining 314 the location accurately, while utilizing standard high-speed data interfaces. In particular, such high-speed data interfaces may be capable of carrying more data than some GPS systems, for example GPS systems that use a SERDES protocol to communicate between a digital antenna controller and a remote receiver.

The method 300 can then end.

Figure 4:
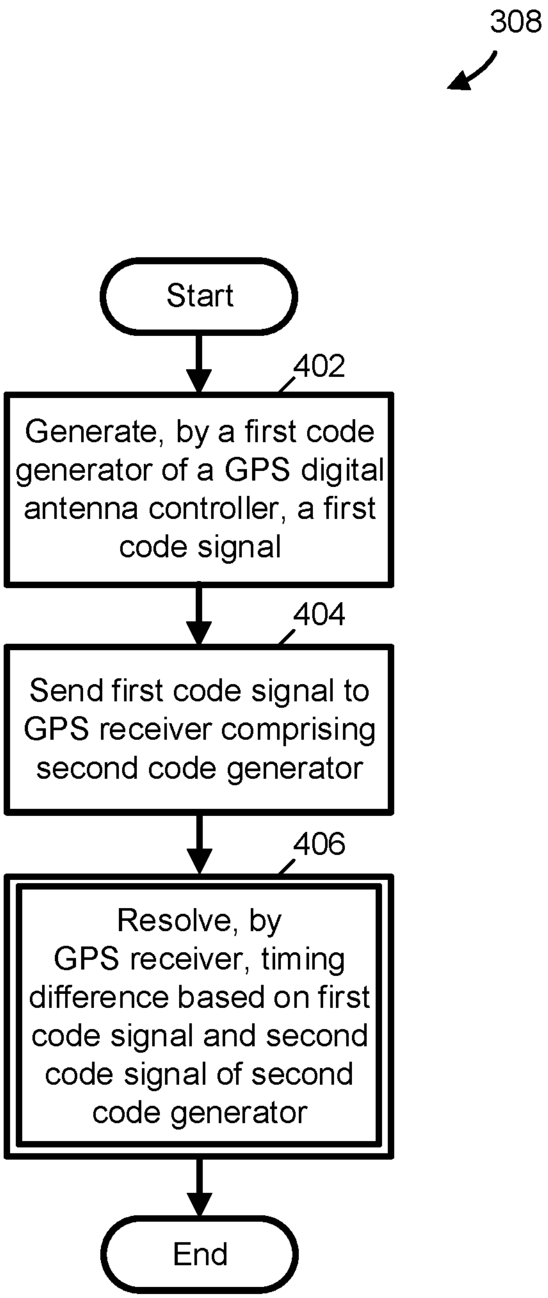
FIG. 4 is a flow diagram illustrating a method to synchronize an oscillator associated with a GPS receiver with an oscillator associated with a GPS digital antenna controller, in accordance with an example of the present disclosure.

FIG. 4 is a flow diagram illustrating a method 308 to synchronize an oscillator associated with a GPS receiver and an oscillator associated with a GPS digital antenna controller, in accordance with an example of the present disclosure. In various examples, method 308 may be performed by a digital antenna controller and/or a receiver, for example of a system, such as the system 200, the digital antenna controller 202, the GPS receiver 204, and/or the processor 226 of the example of FIG. 2 above. In some examples, the receiver may be remote from the digital antenna controller, for example in an aircraft embedded GPS inertial navigator. In some examples, the method 308 may provide additional details of the operation 308 of the method 300 of FIG. 3.

As shown in FIG. 4, synchronizing an oscillator of a GPS receiver with an oscillator of a GPS digital antenna controller starts with a first code generator of a digital antenna controller generating 402 a pilot code signal, for example a pilot or heartbeat signal. The code generator can be configured to generate a continuous GPS pseudo-random code and carrier signal using direct sequence spread spectrum (DSSS) encoding that is synchronous with the frequency reference of the digital antenna electronics system. The generated pilot signal may be identical to the signal generated by a GPS satellite, but without a Doppler shift, and with a frequency and phase set by the local oscillator clock of the digital antenna controller. For example, the pilot code signal can comprise a DSSS waveform and the first code generator can comprise a pseudo-random noise (PN) code generator. The system can use the generated pilot signal to synchronize the local clocks of the digital antenna controller and receiver.

Next, the method of synchronizing oscillators continues with the digital antenna controller sending 404 the generated pilot code signal to a receiver device. The receiver may comprise a second code generator.

In some examples, the digital antenna controller may send 404 the pilot code signal to the second code generator in the GPS receiver via a standard high-speed data interface, such as Ethernet, Universal Serial Bus (USB), Infiniband, Firewire, or the like. Alternatively or additionally, the digital antenna controller can send 404 the generated pilot code signal via any other method, such as a SERDES protocol and/or a coaxial cable. In some examples, the digital antenna controller may send 404 the pilot code signal to the receiver at the antenna's sampling rate, which may be the rate at which the antenna electronics digitally sample live-sky data, for example 22 MHz, or 44 MHz per channel. In some examples, the digital antenna controller may simultaneously send the GPS signals and the synthesized pilot code/carrier signal to the receiver through the high-speed data interface by way of dedicated beams.

Next, the method of synchronizing oscillators continues with resolving 406, by the GPS receiver, a timing difference based on the pilot code signal and a second code signal of the second code generator. The dedicated beam received from the digital antenna controller for the synthesized pilot code/carrier signal may be used by the digital GPS baseband processor as a pilot signal to correlate with the channel beam data and to determine the exact offset of the GPS receiver clock relative to the antenna controller's downconversion clock. For example, the GPS receiver may apply a so-called paper clock method, that is, the GPS receiver may use information about the discrepancy or offset between clocks to track and/or correct the offset between the two clock domains via software. For example, the digital antenna controller and/or receiver may include one or more processors that can execute the disclosed methods, for example via software. In some examples, the GPS receiver may correct the clock offset via hardware or may apply another method to correct the offset. In some examples, the GPS receiver may be further configured to perform frequency syntonization of the first and second code signals.

In some examples, resolving 406 the timing difference can involve performing GPS code and carrier tracking using the pilot code signal according to a GPS tracking function. Resolving 406 the timing difference based on the first and second code signals will be described in greater detail below in the examples of FIGS. 5A-5B.

The method 308 can then end.

Figure 5A:
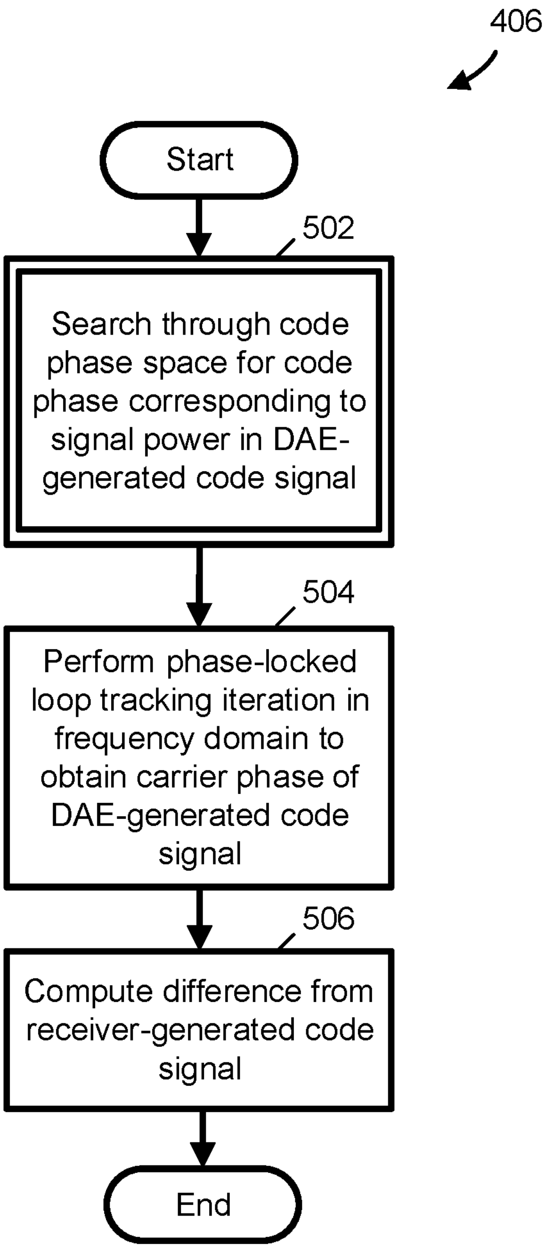
FIG. 5A is a flow diagram illustrating a GPS method to resolve a timing difference between two oscillators based on a code signal generated by a digital antenna controller, in accordance with an example of the present disclosure.

FIG. 5A is a flow diagram illustrating a GPS method 406 to resolve a timing difference between two oscillators based on a code signal generated by a digital antenna controller, in accordance with an example of the present disclosure. In various examples, method 406 may be performed by a receiver, for example a GPS receiver, such as the GPS receiver 204 and/or the processor 226 of the example of FIG. 2 above. In some examples, the receiver may be remote from a corresponding digital antenna controller, for example in an aircraft embedded GPS inertial navigator. In some examples, the GPS method 406 may provide additional details of the operation 406 of the method 308 of FIG. 4. In some examples, resolving a timing difference between two oscillators may be similar to GPS code and carrier tracking according to a GPS tracking function. Such a tracking function can generate a very exact timing difference between a first oscillator associated with the GPS digital antenna controller and a second oscillator associated with the GPS receiver, as the pilot code generator is driven by the first oscillator and the second code generator is driven by the second oscillator.

As shown in FIG. 5A, resolving a timing difference between two oscillators can start with the receiver searching 502 through code phase space for a code phase corresponding to signal power in a code signal generated by a corresponding digital antenna controller or DAE, such as the digital antenna controller 202 of the example of FIG. 2 above. The receiver may receive the DAE-generated code signal from the DAE, for example via a high-speed data interface, a SERDES protocol, a coaxial cable, or another method, as described in the examples of FIGS. 1-4.

In some examples, the code signal generated by the DAE may have the same structure as a GPS signal, which may include a PN sequence. For example, the code signal may include a PN sequence of length 1,023 bits embedded in a carrier wave at a rate of 1.023 megabits/sec.

An objective of searching 502 for the code phase may be to set the receiver's local clock oscillator to the correct phase (e.g., of the 1,023 possible code phases for a PN sequence of length 1,023 bits). Accordingly, searching 502 through code phase space for signal power may involve iteratively testing each possible code phase to determine whether the respective code phase matches the phase of the DAE-generated code signal, for example by detecting signal power based on a correlation between the known PN sequence and the phase-shifted received signal, and/or by matching the known PN sequence to the phase-shifted received signal. Searching 502 through code phase space for signal power will be described in greater detail below in the example of FIG. 5A.

Next, the method of resolving a timing difference between two oscillators can continue with performing 504 tracking iteration (for example, a phase-locked loop (PLL) or frequency locked loop iteration) in the frequency domain to obtain a carrier phase (e.g., a phase offset) of the code signal generated by the DAE.

Next, the method of resolving a timing difference between two oscillators continues with computing 506 a difference of the code and carrier phases determined for the DAE-generated code signal compared with the receiver-generated code signal. In some examples, the receiver-generated code signal may be identical to the DAE-generated pilot code signal, except the receiver-generated code signal may be generated based on the GPS receiver's local clock. Accordingly, these two code signals can be used to determine 506 the exact offset between the GPS receiver clock and the antenna controller downconvert clock.

For example, the system may compute a correlation of the DAE-generated and the receiver-generated code signals with various relative phase shifts introduced, so as to determine the phase shift providing the maximum correlation. In some examples, the system may compute the correlation with phase shifts of half a wavelength and/or half a pulse width. In some examples, the DAE-generated and receiver-generated code signals have the same frequency without a relative Doppler shift, so determining a frequency shift may be unnecessary. Alternatively, in some examples, the system may determine a frequency shift.

The method 406 can then end.

Figure 5B:
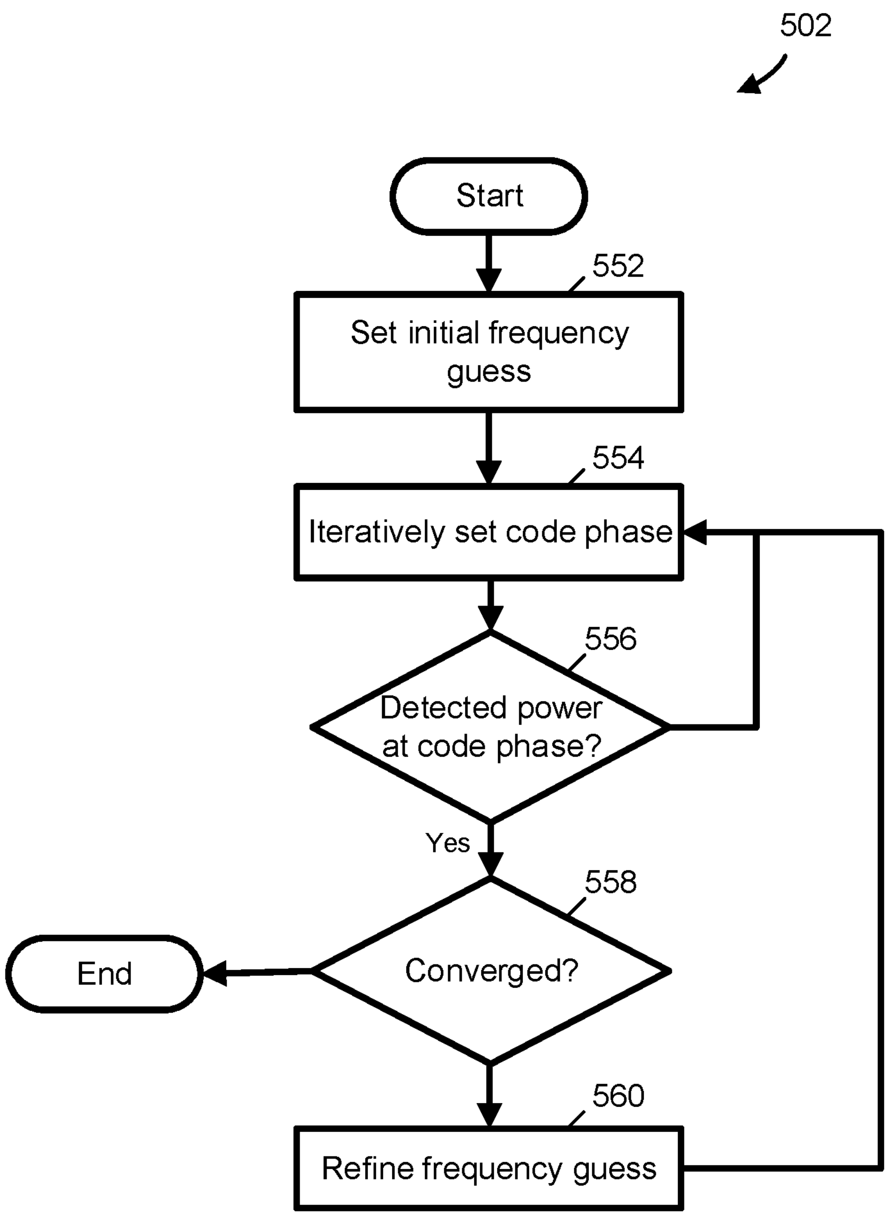
FIG. 5B is a flow diagram illustrating a GPS method to search for a code phase of a code signal generated by a digital antenna controller, in accordance with an example of the present disclosure.

FIG. 5B is a flow diagram illustrating a GPS method 502 to search for a code phase and/or a carrier frequency of a code signal generated by a digital antenna controller, in accordance with an example of the present disclosure. In various examples, method 502 may be performed by a receiver, for example a GPS receiver, such as the GPS receiver 204 and/or the processor 226 of the example of FIG. 2 above. In some examples, the receiver may be remote from a corresponding digital antenna controller, for example in an aircraft embedded GPS inertial navigator. In some examples, the GPS method 502 may provide additional details of the operation 502 of the method 406 of FIG. 5A. In some examples, searching for a code phase and/or a carrier frequency of a code signal may be similar to GPS code and carrier tracking according to a GPS tracking function.

One objective of searching for the code phase may be to set the receiver's local clock oscillator to the correct phase (e.g., of the 1,023 possible code phases for a PN sequence of length 1,023 bits). Accordingly, searching through code phase space may involve iteratively testing each possible code phase to determine whether the respective code phase matches the phase of the DAE-generated code signal, as disclosed herein.

As shown in FIG. 5B, searching for a code phase and/or a carrier frequency of a code signal can start with the receiver setting 552 an initial frequency guess. For example, the receiver can set 552 an initial frequency guess within an iterative loop, such as a first frequency value within a range of values to be iterated over.

Next, the method of searching for a code phase and/or a carrier frequency of a code signal continues with iteratively setting 554 a code phase. For example, the receiver can set 554 a code phase as part of an iterative loop, such as a code phase value within a range of values to be iterated over.

In an example, the receiver may iteratively test each possible code phase to determine whether it matches the phase of the DAE-generated code signal. Accordingly, the receiver may iteratively set 554 the code phase value to each possible code phase value.

Next, the method of searching for a code phase and/or a carrier frequency of a code signal continues with determining 556 whether power is detected (e.g., based on a correlation) at the trial code phase and/or carrier frequency. Responsive to power not being detected at the trial code phase and/or carrier frequency, the method 502 can then refine the trial code phase and/or carrier frequency, and return to iterate operation 554.

Responsive to power being detected at the trial code phase and/or carrier frequency, the method 502 can then continue with operation 558.

Next, responsive to power being detected at the trial code phase and/or carrier frequency, the method of searching for a code phase and/or a carrier frequency of a code signal continues with determining 558 whether the identified code phase and/or carrier frequency are sufficiently converged. For example, the receiver can determine 558 whether the identified code phase and/or carrier frequency are sufficiently converged by determining whether the power detected at the trial code phase and/or carrier frequency is sufficient, for example by comparing the power detected (e.g., based on a correlation) to a threshold power level. In another example, the receiver can determine 558 whether the identified code phase and/or carrier frequency are sufficiently converged by determining whether code phase and/or carrier frequency are sufficiently close to their values in previous iterations. For example, the receiver can determine whether the identified code phase and/or carrier frequency differ from their values in previous iterations by less than a threshold amount.

Responsive to the identified code phase and/or carrier frequency being converged, the method 502 can then end.

Responsive to the identified code phase and/or carrier frequency not being converged, the method 502 can then continue with operation 560.

Next, responsive to the identified code phase and/or carrier frequency not being converged, the method of searching for a code phase and/or a carrier frequency of a code signal continues with refining 560 the frequency guess. The method 502 can then return to iterate operation 554.

In some examples, the GPS system can include one or more non-transitory computer readable medium, which may include any suitable medium for storing digital information, such as a hard drive, a server, a flash memory, and/or random access memory (RAM), or a combination of memories. The one or more non-transitory computer readable medium may be read by one or more processors, such as processors 226 of the example of FIG. 2 above, which may execute code and/or instructions stored in a memory, such as instructions for any of the methods disclosed herein in the examples of FIGS. 3-4 and 5A-5B, and/or any other methods. In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, flash drives, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable device. In any such hardware cases that include executable software, the terms "circuit" or "circuitry" are intended to include a combination of software and hardware such as a programmable device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the example embodiments. It will be appreciated, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

ADDITIONAL EXAMPLES

As described above, it is desirable to integrate digital antenna electronics with remotely located GPS receivers using a more standardized interface. However, commercial standards for high-speed digital transfer of data are nominally asynchronous; examples include Ethernet, USB, IEEE1394, etc. These asynchronous protocols are incapable of preserving the clock recovery function available in SERDES instantiations, so an alternative method of clock synchronization must be performed.

Example 1 is a Global Positioning System (GPS) digital antenna controller. The GPS digital antenna controller can include antenna electronics, a digital antenna controller clock, a code generator, and an interface. The antenna electronics can be configured to receive a GPS signal. The digital antenna controller clock configured to regulate antenna sampling of the antenna electronics or to provide a reference for downconversion. The code generator can be configured to generate a code signal synchronized with the digital antenna controller clock. The interface can be configured to send the GPS signal and the code signal to a GPS receiver.

Example 2 includes the GPS digital antenna controller of Example 1, wherein the interface can comprise an asynchronous data interface.

Example 3 includes the GPS digital antenna controller of Example 1 or 2, wherein the GPS digital antenna controller does not comprise a serializer/deserializer (SERDES) interface. The interface can comprise at least one of Ethernet, Universal Serial Bus (USB), Infiniband, or Firewire.

Example 4 includes the GPS digital antenna controller of any one of the previous Examples, wherein the code signal comprises a direct sequence spread spectrum (DSSS) waveform and the code generator comprises a pseudo-random noise (PN) code generator.

Example 5 includes the GPS digital antenna controller of any one of the previous Examples, wherein the GPS receiver is remote from the GPS digital antenna controller.

Example 6 is a system including the GPS digital antenna controller of any one of the previous Examples, and the GPS receiver. The code generator can be a first code generator, and the code signal can be a pilot code signal. The GPS receiver can include a second code generator configured to generate a second code signal, and a processor configured to resolve a timing difference based on the pilot code signal and the second code signal of the second code generator.

Example 7 includes the system of Example 6, wherein to resolve the timing difference comprises to perform, by the processor, GPS code and carrier tracking using the pilot code signal and according to a GPS tracking function.

Example 8 includes the system of any one of Examples 6-7, wherein the timing difference comprises a timing difference between the digital antenna controller clock of the GPS digital antenna controller and a second clock associated with the GPS receiver.

Example 9 includes the system of Example 8, wherein the first code generator is driven by the digital antenna controller clock and the second code generator is driven by the second clock.

Example 10 includes the system of any one of Examples 6-9, wherein the GPS receiver is further configured to perform frequency synchronization of the pilot code signal and second code signal. In still other examples, the GPS receiver is further configured to perform time and frequency synchronization of the pilot code signal and second code signal.

Example 11 includes the system of any one of Examples 6-10, wherein the GPS digital antenna controller is further configured to process the received GPS signal. To send the GPS signal and the code signal to the GPS receiver can further comprise to send the processed GPS signal and the pilot code signal to the GPS receiver. The GPS receiver can be further configured to synchronize a code and a carrier of the processed GPS signal based on the second code signal and the resolved timing difference, determine a Doppler shift and precise timing difference based on the synchronized code and carrier, properly scale tracking of the GPS signals from digital live-sky beams based on the Doppler shift, and determine a location based on the Doppler shift.

Example 12 is a system. The system can comprise a Global Positioning System (GPS) digital antenna controller comprising a first code generator and a first interface. The first code generator can be configured to generate a pilot code signal. The first interface can be configured to send the pilot code signal from the GPS digital antenna controller. The system can further comprise a GPS receiver comprising a second code generator and a second interface. The second code generator can be configured to generate a second code signal. The second interface can be configured to receive the pilot code signal from the GPS digital antenna controller. The GPS receiver can comprise a processor configured to resolve a timing difference based on the pilot code signal and a second code signal of the second code generator.

Example 13 is a Global Positioning System (GPS) receiver. The GPS receiver can comprise an interface, a code generator, and a processor. The interface can be configured to receive a GPS signal and a pilot code signal from a GPS digital antenna controller. The code generator can be configured to generate a second code signal. The processor can be configured to resolve a timing difference based on the pilot code signal and the second code signal of the second code generator.

Example 14 includes the GPS receiver of any one of Examples 12 through 13, wherein the interface can comprise an asynchronous data interface.

Example 15 includes the GPS receiver of any one of Examples 12 through 14, wherein to resolve the timing difference comprises to perform, by the processor, GPS code and carrier tracking using the pilot code signal and according to a GPS tracking function.

Example 16 is a system including the GPS receiver of any one of Examples 12 through 15 and the GPS digital antenna controller. The code generator can be a second code generator, and the interface can be a second interface. The GPS digital antenna controller can be remote from the GPS receiver. The GPS digital antenna controller can include a first code generator and a first interface. The first code generator can be configured to generate the pilot code signal synchronized with an antenna sampling clock or downconversion reference clock. The first interface can be configured to send the pilot code signal from the GPS digital antenna controller.

Example 17 includes the system of Example 16, wherein the pilot code signal comprises a direct sequence spread spectrum (DSSS) waveform and the first code generator comprises a pseudo-random noise (PN) code generator.

Example 18 includes the system of any one of Examples 16-17, wherein the GPS digital antenna controller is further configured to receive the GPS signal and process the received GPS signal. The first interface can be further configured to send the processed GPS signal to the GPS receiver. The GPS receiver can be further configured to synchronize a code and a carrier of the processed GPS signal based on the second code signal and the resolved timing difference, determine a Doppler shift based on the synchronized code and carrier, and determine a location based on the Doppler shift.

Example 19 is a Global Positioning System (GPS) method. The method can comprise receiving, by a GPS digital antenna controller, a GPS signal. The method can further comprise generating, by a first code generator of the GPS digital antenna controller, a pilot code signal synchronized with an antenna sampling clock or downconversion reference clock. The method can further comprise sending, by the GPS digital antenna controller and via a asynchronous data interface, the GPS signal and the pilot code signal to a GPS receiver comprising a second code generator. The method can further comprise resolving, by a processor of the GPS receiver, a timing difference based on the pilot code signal and a second code signal of the second code generator.

Example 20 includes the GPS method of Example 19, wherein the asynchronous data interface comprises at least one of Ethernet, Universal Serial Bus (USB), Infiniband, Firewire, or another asynchronous data interface.

Example 21 includes the GPS method of any one of Examples 19 through 20, wherein resolving the timing difference comprises performing, by the processor of the GPS receiver, GPS code and carrier tracking using the pilot code signal and according to a GPS tracking function.

Example 22 includes the GPS method of any one of Examples 19 through 21, wherein the pilot code signal comprises a direct sequence spread spectrum (DSSS) waveform and the first code generator comprises a pseudo-random noise (PN) code generator.

Example 23 includes the GPS method of any one of Examples 19 through 22, further comprising processing, by the GPS digital antenna controller, the received GPS signal. Sending the GPS signal and the pilot code signal can further comprise sending, by the GPS digital antenna controller to the GPS receiver via the interface, the processed GPS signal and the pilot code signal. The GPS method can further comprise synchronizing, by the GPS receiver, a code and a carrier of the processed GPS signal based on the second code signal and the resolved timing difference. The GPS method can further comprise determining, by the GPS receiver, a Doppler shift based on the synchronized code and carrier. The GPS method can further comprise determining, by the GPS receiver, a location based on the Doppler shift.

The foregoing description of the embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A Global Positioning System (GPS) digital antenna controller, comprising:

antenna electronics configured to receive a GPS signal;

a digital antenna controller clock configured to regulate antenna sampling of the antenna electronics or to provide a reference for downconversion;

a code generator configured to generate a code signal synchronized with the digital antenna controller clock; and an interface configured to send the GPS signal and the code signal to a GPS receiver;

wherein:

the code generator is a first code generator, the code signal is a pilot code signal, and the GPS receiver includes a second code generator configured to generate a second code signal, and a processor configured to resolve a timing difference based on the pilot code signal and the second code signal of the second code generator.

2. The GPS digital antenna controller of claim 1, wherein the interface comprises an asynchronous data interface.

3. The GPS digital antenna controller of claim 1, wherein the GPS digital antenna controller does not comprise a serializer/deserializer (SERDES) interface, and wherein the interface comprises at least one of Ethernet, Universal Serial Bus (USB), Infiniband, or Firewire.

4. The GPS digital antenna controller of claim 1, wherein the code signal comprises a direct sequence spread spectrum (DSSS) waveform and the code generator comprises a pseudo-random noise (PN) code generator.

5. The GPS digital antenna controller of claim 1, wherein the GPS receiver is remote from the GPS digital antenna controller.

6. The system of claim 1, wherein to resolve the timing difference comprises to perform, by the processor, GPS code and carrier tracking using the pilot code signal and according to a GPS tracking function.

7. The system of claim 1, wherein the timing difference comprises a timing difference between the digital antenna controller clock of the GPS digital antenna controller and a second clock associated with the GPS receiver.

8. The system of claim 7, wherein the first code generator is driven by the digital antenna controller clock and the second code generator is driven by the second clock.

9. The system of claim 1, wherein the processor is further configured to perform frequency synchronization of the pilot code signal and second code signal.

10. The system of claim 1, wherein the GPS digital antenna controller is further configured to process the received GPS signal, to send the GPS signal and the code signal to the GPS receiver further comprises to send the processed GPS signal and the pilot code signal to the GPS receiver, and the GPS receiver is further configured to synchronize a code and a carrier of the processed GPS signal based on the second code signal and the resolved timing difference, determine a Doppler shift based on the synchronized code and carrier, and determine a location based on the Doppler shift.

* * * * *